United States Patent [19]

Kajino et al.

[11] Patent Number: 5,209,079
[45] Date of Patent: May 11, 1993

[54] CONTROL APPARATUS FOR AIR CONDITIONER USED FOR VEHICLES

[75] Inventors: Yuuichi Kajino, Nagoya; Koichi Ban, Toukai; Yuuji Honda, Kariya; Hikaru Sugi, Nagoya, all of Japan

[73] Assignee: Nippondenso Co., Ltd., Kariya, Japan

[21] Appl. No.: 710,039

[22] Filed: Jun. 5, 1991

[30] Foreign Application Priority Data

Jun. 8, 1990 [JP] Japan .................. 2-151352

[51] Int. Cl.⁵ ............................................ F25D 17/00
[52] U.S. Cl. ...................................... 62/180; 236/91.6; 454/75
[58] Field of Search ................. 236/91 C; 165/28, 43; 454/75; 62/180

[56] References Cited

U.S. PATENT DOCUMENTS

| | | |
|---|---|---|
| 4,890,460 | 1/1990 | Osawa et al. .......................... 62/180 |
| 4,978,061 | 12/1990 | Ogihara et al. .................... 236/91 C |
| 5,072,106 | 12/1991 | Osawa ................................ 454/75 |

FOREIGN PATENT DOCUMENTS

| | | |
|---|---|---|
| 47-46973 | 11/1972 | Japan . |
| 52-14997 | 4/1977 | Japan . |
| 56-86815 | 7/1981 | Japan . |
| 58-20810 | 4/1983 | Japan . |
| 59-34497 | 9/1984 | Japan . |
| 59-39333 | 9/1984 | Japan . |
| 0017550 | 1/1987 | Japan ............................ 236/91 C |
| 63-45965 | 9/1988 | Japan . |

Primary Examiner—William E. Wayner
Attorney, Agent, or Firm—Cushman, Darby & Cushman

[57] ABSTRACT

A control apparatus for an air conditioner used for a vehicle can properly control the temperature of air in the vehicle according to the quantity of solar radiation so as to maintain the temperature as not too cool for a person in the vehicle while suppressing the temperature as not too hot for the person. The control apparatus comprises a solar radiation sensor for detecting the quantity of solar radiation coming into the vehicle room; an operation unit for entering a set temperature; a target temperature determining unit for receiving an processing a solar radiation quantity signal from the solar radiation sensor and a set temperature signal from the operation unit, and successively finding target temperatures from a first temperature region which is relatively low and in which a temperature decreases slightly relative to an increase in the quantity of solar radiation and a second temperature region which is relatively high and in which a temperature decreases according to an increase in the quantity of solar radiation, and selecting and determining one of the target temperatures according to a predetermined program; and an adjusting unit for adjusting the temperature of air to be blown into the vehicle room according to the target temperature.

11 Claims, 5 Drawing Sheets

CONTROL APPARATUS FOR AIR CONDITIONER USED FOR VEHICLES

BACKGROUND OF THE INVENTION

1. Field of the Invention

The present invention relates to a control apparatus for air conditioners used for vehicles, and more particularly, to a control apparatus able to control the temperature and volume of air in the air conditioner to thereby compensate for solar radiation and give a comfortable feeling to a person in the vehicle.

2. Description of the Related Art

There are many known controlling apparatus which can correct and control the temperature and/or volume of air in an air conditioner of a vehicle according to the quantity of solar radiation coming into the room of the vehicle.

For example, Japanese Unexamined Patent Publication No. 56-86815 calculates a required air temperature with an equation involving a term of the quantity of solar radiation, and according to the calculated temperature, controls the volume of air from a blower of the air conditioner and the opening of an air mixing damper of the air conditioner, thereby changing the volume and temperature of air to be blown from the air conditioner according to the quantity of solar radiation.

Japanese Examined Patent Publication No. 58-20810 changes volumes of air to be fed to upper and middle layers in the vehicle room according to the quantity of solar radiation, thereby compensating for the solar radiation.

Japanese Examined Utility Model Publication No. 59-34497 and Japanese Examined Patent Publication No. 63-45965 blows cool air from a ventilation diffuser even during heating due to solar radiation.

Japanese Unexamined Patent Publication No. 56-86815, however, pays no attention to whether or not ventilation and/or heating operations are being carried out when controlling the temperature and volume of air according to the quantity of solar radiation. If the quantity of solar radiation increases during heating to thus change a required air temperature, the disclosure reduces the heating temperature and volume, thereby lowering the temperature around the feet of a person in the vehicle even during a period in which heating is required. In addition, no ventilation takes place to compensate for the solar radiation during the heating, so that the upper body of the person in the vehicle, which is particularly influenced by the solar radiation, may not be cooled.

Japanese Examined Patent Publication No. 58-20810, Japanese Examined Utility Model Publication No. 59-34497, and Japanese Examined Patent Publication No. 63-45965 change only the temperature and volume of ventilation air according to the quantity of solar radiation, and this may prevent the feet of the person in the vehicle from being cooled. These techniques, however, simply lower the air temperature and increase the air volume when solar radiation is felt, and thus in some cases, the air temperature may be excessively lowered and the person in the vehicle may feel too cold.

A diffuser of the vehicle air conditioner is usually positioned not far from the face of the person in the vehicle, and thus the person is sensitive to the temperature of air from the diffuser, and feels comfortable or uncomfortable accordingly. It is, therefore, very important to control the temperature of air to ensure the comfort of the person in the vehicle.

SUMMARY OF THE INVENTION

An object of the invention is to provide a control apparatus for air conditioners used for vehicles, which can properly control the temperature of air according to the quantity of solar radiation so as to maintain the temperature as not too cool for a person in the vehicle while suppressing the temperature as not too for the person.

In view of this, a first object of the invention is to provide a control apparatus for air conditioners used for vehicles, which finds target temperatures in two regions and selects one of the temperatures, thereby cancelling an increase in temperature in a vehicle room due to solar radiation, without excessively cooling the vehicle room.

A second object of the invention is to provide a control apparatus for air conditioners used for vehicles, which automatically gives priority to preventing a vehicle room from being excessively cooled over cancelling a temperature increase in the vehicle room due to solar radiation.

A third object of the invention is to provide a control apparatus for air conditioners used for vehicles, which increases the volume of cool air for compensating a shortage of cool air caused by giving priority to preventing a vehicle room from being excessively cooled over cancelling a temperature increase in the vehicle room due to solar radiation.

A fourth object of the invention is to provide a control apparatus for air conditioners used for vehicles, which can increase the volume of cool air for compensating a shortage of cool air when a calculated target temperature is too high compared with the quantity of solar radiation.

A fifth object of the invention is to provide a control apparatus for air conditioners used for vehicles, which can automatically give priority to prevent a vehicle room from being cooled excessively over cancelling a temperature increase in the vehicle room due to solar radiation, and separately control the volumes and temperatures of upward blowing ventilation air and downward blowing heating air.

In order to accomplish these objects, a control apparatus for air conditioners used for vehicles according to the present invention sets target temperatures, brings temperatures in a vehicle room to the target temperature, and maintains the vehicle room at the target temperatures by adjusting air blown into the vehicle room. The control apparatus comprising:

a solar radiation sensor for detecting the quantity of solar radiation coming into the vehicle room;

an operation means for entering a set temperature;

a target temperature determining means for receiving and processing a solar radiation quantity signal from the solar radiation sensor and a set temperature signal from the operation means, and successively finding the target temperatures in the course of said processing operation and wherein a temperature of air to be blown into a vehicle room belonging to a first temperature region in which the temperature is relatively low and in which the decrement ratio of the temperature decrease relative to an increase in the quantity of solar radiation and the temperature of air to be blown thereinto belonging to a second temperature region in which the temperature is relatively high and in which an amount of the temperature decreases according to an increase in the quantity of solar radiation are both obtained, and selecting any one of the temperatures of air to be blown into the room according to a predetermined program and determining the target temperature; and an adjusting means for adjusting the temperatures of air to be blown into the vehicle room according to the target temperatures.

Figure 1:
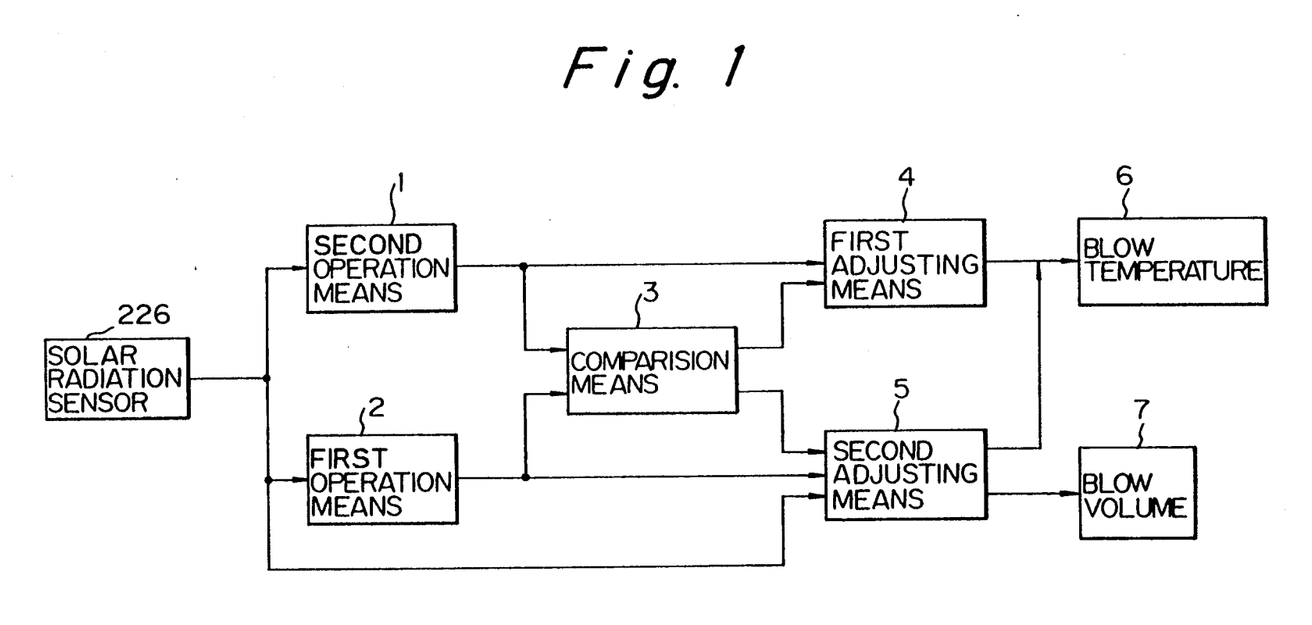
FIG. 1 is a block diagram showing an arrangement of the invention.

FIG. 1 is a block diagram showing a principle of the control apparatus for air conditioners used for vehicles according to the invention.

Control elements used by the invention are a target decrease in blow temperature for cancelling heat received by the vehicle from solar radiation detected by the solar radiation sensor, a cancelling ventilation temperature (TV2) determined according to the blow temperature decrease, a correcting value in blow temperature determined according to the quantity of solar radiation and predetermined blow temperature characteristics so that a person in the vehicle may feel comfortable, a lowest comfortable ventilation temperature (TV1) determined according to the comfortable temperature decrease, a highest heating temperature (TH1), a final ventilation volume (VAV), and a final heating volume (VAH).

As shown in FIG. 1, the control apparatus of the invention comprises:

a solar radiation sensor 226 for detecting the quantity of solar radiation received by the vehicle;

a second operation means 1 for calculating a temperature of air to be blown in a vehicle room $TV_2$ for cancelling heat due to the solar radiation detected by the solar radiation sensor 226;

a first operation means 2 for calculating a temperature of air to be blown in a vehicle room $TV_1$ according to the quantity of solar radiation and predetermined blow temperature characteristics utilizing the correcting value $\Delta T$ so that a person in the vehicle may feel comfortable;

a comparison means 3 for comparing a cancelling ventilation temperature (TV2) calculated in the second operation means with a comfortable ventilation temperature (TV1) calculated in the first operation means;

a first adjusting means 4 for adjusting, when the cancelling ventilation temperature (TV2) is higher than the comfortable ventilation temperature (TV1), a final target ventilation temperature (TAOV) to be the cancelling ventilation temperature (TV2) and determining a final heating temperature (TAOH), thereby conditioning air in the vehicle room; and a second adjusting means 5 for adjusting, when the cencelling ventilation temperature (TV2) is lower than the lowest comfortable ventilation temperature (TV1), the final ventilation temperature (TAOV) to be the lowest comfortable ventilation temperature (TV1), determining the final heating temperature (TAOH), and calculating a final ventilation volume (VAV) and a final heating volume (VAH) with the lowest comfortable ventilation temperature (TV1) to cancel the heat due to the solar radiation, thereby conditioning air in the vehicle room.

The first and second adjusting means 4 and 5 control a blow temperature control portion 6 and a blow volume control portion 7, respectively, to establish a required blow temperature and a required blow volume in the vehicle room.

The above arrangement of the invention brings temperature in the vehicle room to the set temperature and maintains the set temperature in the room. When there is solar radiation, the arrangement adjusts a blow temperature and a blow volume to cancel heat due to the solar radiation.

If there is solar radiation, the first or the second adjusting means is selected according to a result of caparison of the comparison means so as to cancel heat due to the solar radiation while maintaining a blow temperature to be comfortable for a person in the vehicle.

Namely, the second operation means 1 calculates a temperature of air to be blown into the room (the cancelling blow temperature $TV_2$) for cancelling heat due to the solar radiation, and the first operation means 2 calculates a temperature of air to be blown into the room with the correct value (the comfortable ventilation temperature $TV_1$) at which the person in the vehicle feels comfortable against the solar radiation.

When the cancelling blow temperature $TV_2$ is higher than the comfortable ventilation temperature $TV_1$, the heat due to the solar radiation can be cancelled only by decreasing the temperature of blown air without giving the person in the vehicle an uncomfortable feeling. The first adjusting means, therefore, adjusts the blow temperature to the cancelling ventilation temperature to decrease the temperature of air in the vehicle room. Since the cancelling ventilation temperature is higher than the comfortable ventilation temperature, the air in the vehicle room will not be cooled lower than the comfortable ventilation temperature, and the person in the vehicle will not feel too cool.

When the cancelling ventilation temperature $TV_2$ is higher than the comfortable ventilation temperature $TV_1$, the heat due to the solar radiation may be cancelled by adjusting the temperature of air in the vehicle room according to the cancelling ventilation temperature. In this case, however, the person in the vehicle may feel cold because the cancelling ventilation temperature is lower than the comfortable ventilation temperature. The second adjusting means, therefore, adjusts the temperature of blown air to the comfortable ventilation temperature, and to cancel part of the heat of solar radiation which cannot be cancelled by the comfortable ventilation temperature, calculates a final ventilation volume with the comfortable ventilation temperature, thereby conditioning air in the vehicle room.

In this case, since the cancelling ventilation temperature is lower than the comfortable ventilation temperature, the temperature of blown air is limited to the comfortable ventilation temperature so that the person in the vehicle may not feel too cool. Part of the heat of solar radiation which cannot be cancelled by the comfortable ventilation temperature is cancelled by increasing the volume of the blown air, thereby preventing a room temperature from increasing due to the solar radiation.

DESCRIPTION OF THE PREFERRED EMBODIMENTS

Embodiments of the invention will be described in detail with reference to the drawings.

Figure 2:
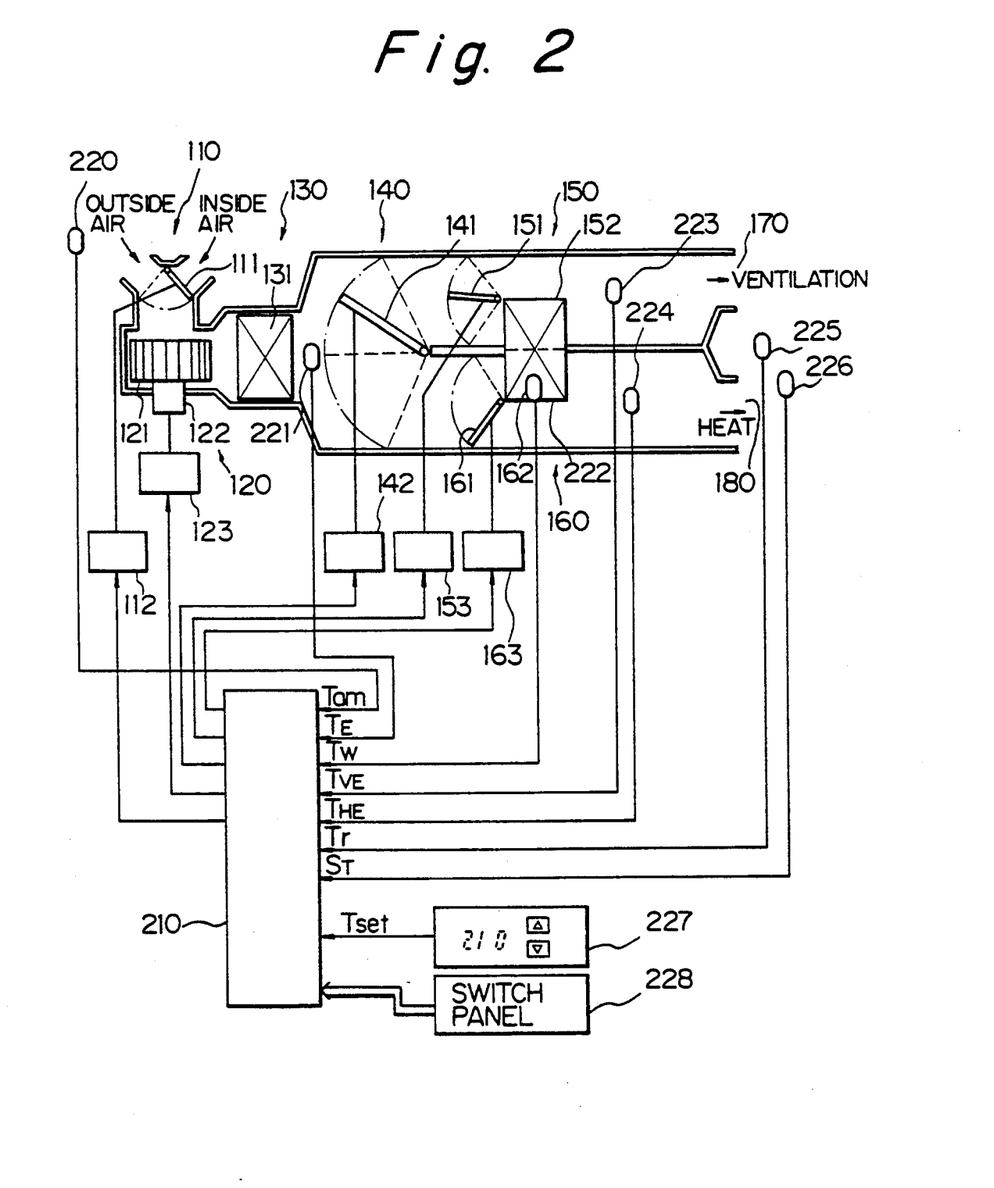
FIG. 2 is a view showing an air conditioner used for vehicles according to an embodiment of the invention.

FIG. 2 is a block diagram showing a control apparatus for controlling an air conditioner 100 for a vehicle. The air conditioner 100 has a blower 120 which produces a wind. The wind passes through an evaporator 131, a switching damper 141, heater cores 152 and 162, and air mixing dampers 151 and 161. The wind then exits from a ventilation diffuser 170 oriented upward into a vehicle room and a heat diffuser 180 oriented downward into the vehicle room. The air conditioner 100 further comprises:

a solar radiation sensor 226 for detecting the quantity of solar radiation coming into the vehicle room;

a temperature setting device 227 through which a set temperature is entered; and a control apparatus for receiving signals from the solar radiation sensor 226 and temperature setting device 227 and controlling the blower 120 and the openings of the dampers 141, 151, and 161.

The control apparatus incorporating:

a means for finding a required blow temperature (TAOB) and a required blow volume (VA1) according to the set temperature (Tset) provided by the temperature setting device;

a means for finding a correction value ($\Delta t$) according to a characteristic curve which involves a region in which the correction value is relatively small and increases as the quantity of solar radiation provide by the solar radiation sensor 226 increases and a region in which the correction value is relatively large and increases only slightly as the quantity of solar radiation increases;

a means for finding lowest ventilation temperature (TV1), corresponding to the comfortable ventilation temperature, according to the required blow temperature (TAOB), set temperature (Tset), and correction value ($\Delta t$);

a means for setting a highest heating temperature (TH1) exceeding a predetermined temperature according to the reburied blow temperature (TAOB);

a means for setting a blow ratio (P) for distributing air to the ventilation diffuser 170 and heat diffuser 180 according to the required blow temperature (TAOB), set temperature (Tset), and highest heating temperature (TH1);

a means for finding a cancelling ventilation temperature (TV2) with a blow volume of "$(1-P) \times VA1$" from the ventilation diffuser 170, for cancelling an increase in temperature in the vehicle room due to the solar radiation;

a means for comparing the lowest ventilation temperature (TV1) with the cancelling ventilation temperature (TV2), and selecting the cancelling ventilation temperature as a final ventilation temperature if the cancelling ventilation temperature (TV2) is higher than the lowest ventilation temperature (TV1), or if not so, the lowest ventilation temperature (TV1) as the final ventilation temperature;

a means for determining, with the cancelling ventilation temperature (TV2) being the final ventilation temperature, a final ventilation volume from the ventilation diffuser 170 to be $(1-P) \times VA1$, and a final heating volume (VAH) from the heat diffuser 180 to be $P \times VA1$;

a means for determining, with the lowest ventilation temperature (TV1) being the final ventilation temperature, a final ventilation volume according to the quantity of solar radiation, set temperature, and lowest ventilation temperature so that the final ventilation volume may exceed the one calculated according to the blow ratio (P), and a final heating volume (VAH) from the heat diffuser 180 to be $P \times VA1$:

a means for finding a total blow volume from the final ventilation volume (VAV) and final heating volume (VAH) to control the blower;

a means for finding a position (S) of the switching damper (141) from the final ventilation volume (VAV) and final heating volume (VAH) to control the switching damper (141); and a means for controlling the openings of the air mixing dampers (151, 161) to realize the final ventilation temperature and final heating temperature.

An operation of the above arrangement will be explained.

The required blow temperature (TAOB) and required blow volume (VA1) are calculated.

A correction value $\Delta T$ is found such that a decrease in blow temperature may not be excessive to give a person in the vehicle an uncomfortable feeling. The correction value is saturated when the quantity of solar radiation increases to a certain extent.

The person in the vehicle sets a set temperature. According to the set temperature and correction value, the lowest ventilation temperature (TV1) of air which blows toward the face of the person in the vehicle is found. Since the lowest ventilation temperature (TV1) is found according to the correction value, it is saturated when the quantity of solar radiation increases to a certain extent.

The final heating temperature (TAOH) of air which blows toward the feet of the person in the vehicle is calculated. This temperature (TAOH) is set to be higher than a predetermined temperature not to cool the feet of the person in the vehicle. The temperature (TAOH) is a final one and not corrected later.

The blow ratio (P) for distributing air for the ventilation diffuser 170 and heat diffuser 180 is determined according to the required blow temperature (TAOB), set temperature (Tset), and heating temperature (TH1), i.e., final heating temperature (TAOH). Since the heating temperature (TH1) is final and not corrected later, a heating volume (VH) is found from the heating temperature (TH1). Based on the heating volume (VH) and required blow volume (VA1), a ventilation volume (VAV) is set. The heating volume will be final one.

According to the ventilation volume (VAV) which has been calculated according to the blow ratio (P) with the equation of "$VAV = (1-P) \times VA1$", the cancelling ventilation of temperature (TV2) for cancelling an increase in temperature in the vehicle room due to the solar radiation is obtained. The cancelling ventilation temperature (TV2) with the ventilation volume (VAV) is to cancel the increase in temperature in the vehicle room due to the solar radiation.

The lowest of the ventilation temperature (TV1) and the cancelling ventilation temperature (TV2) is selected.

When the cancelling ventilation temperature (TV2) is selected, the ventilation volume is determined according to the blow ratio and required blow volume.

When the lowest ventilation temperature (TV1) is selected, it is not sufficient to cancel the increase in temperature in the vehicle room due to the solar radiation, so that the ventilation volume of air which is oriented toward the face of the person in the vehicle is increased. The increase in the ventilation volume is determined according to the quantity of solar radiation, set temperature, and lowest ventilation temperature (TV1). With this control, the person in the vehicle feels comfortable even if the room temperature is not sufficiently decreased.

The total blow volume (VA) of the blower is determined according to the final ventilation volume (VAV) and final heating volume (VAH). When the cancelling ventilation temperature (TV2) is selected, the total blow volume (VA) is equal to the required blow volume (VA1), and when the lowest comfortable ventilation temperature (TV1) is selected, the total blow volume (VA) is increased because the ventilation volume (VAV) is increased.

Based on the final ventilation volume (VAV) and heating volume (VAH), the position (S) of the switching damper (141) is controlled.

To realize the final ventilation temperature and lowest comfortable ventilation temperature, the openings of the air mixing dampers 151 and 161 are controlled.

The operation and principle of the arrangement of the invention will be explained in detail with reference to a block diagram of FIG. 2 and flowcharts of FIGS. 3 and 4.

In FIG. 2, the air conditioner 100 comprises an inside/outside air switching unit 110, the blower 120, a cooler 130, an airflow distributor 140, a ventilator 150 a heater 160, the ventilation diffuser 170, and the heat diffuser 180.

The inside/outside air switching unit 110 has an inside/outside air switching damper 111 driven by a servomotor 112.

The blower 120 comprises a fan 121 and a motor 122. The revolution speed of the motor 122 is adjusted by a motor driving circuit 123.

The cooler 130 has the evaporator 131 of a refrigerating cycle (not shown) driven by a vehicle engine.

The airflow distributor 140 comprises the switching damper 141 and a servomotor 142 for driving the damper 141. A ratio of ventilation volume and heating volume is adjusted according to the position of the damper 141.

The ventilator 150 comprises the air mixing damper 151 and a heat core 152 whose heat source is cooling water for the vehicle engine. The air mixing damper 151 is driven by a servomotor 153.

The heater 160 comprises the air mixing damper 161 and a heat core 162 whose heat source is the cooling water for the vehicle engine. The air mixing damper 161 is driven by a servomotor 163. The heat core 152 of the ventilator 150 and the heat core 162 of the heater 160 are integrally formed in one body.

A control apparatus 210 of this embodiment incorporates a microcomputer. The control apparatus 210 receives signals from an ambient temperature sensor 220, a temperature sensor 221 for measuring a temperature at the back of the evaporator 131, a water temperature sensor 222, a ventilation duct sensor 223, a heating duct sensor 224, a room temperature sensor 225, and the solar radiation sensor 226. The control apparatus also receives a set temperature signal (Tset) from the temperature setting device 227, and instruction signals from a switch panel 228 having a known auto switch, an OFF switch and manual setting switches for various modes.

Figure 3:
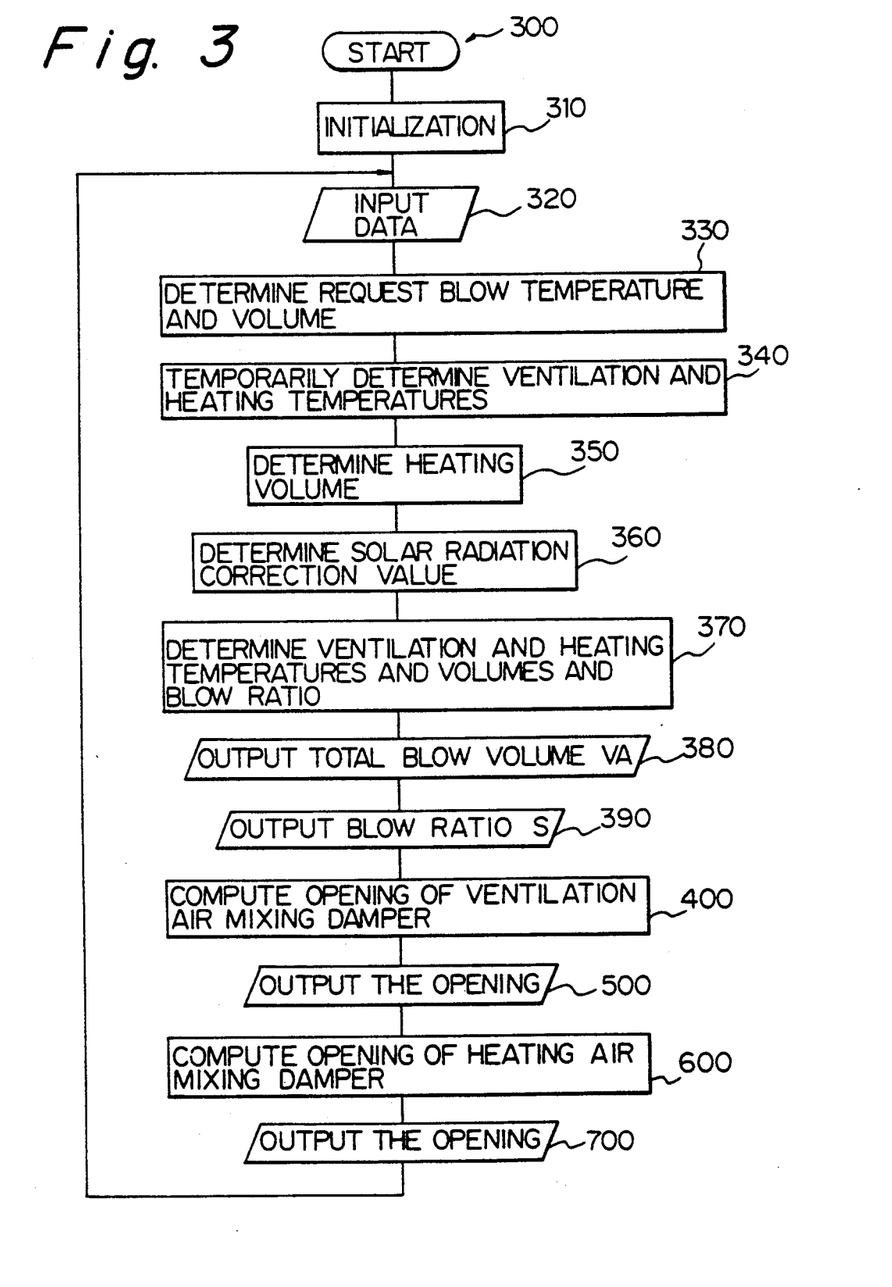
FIG. 3 is a flowchart showing an operation of the embodiment.
Figure 4:
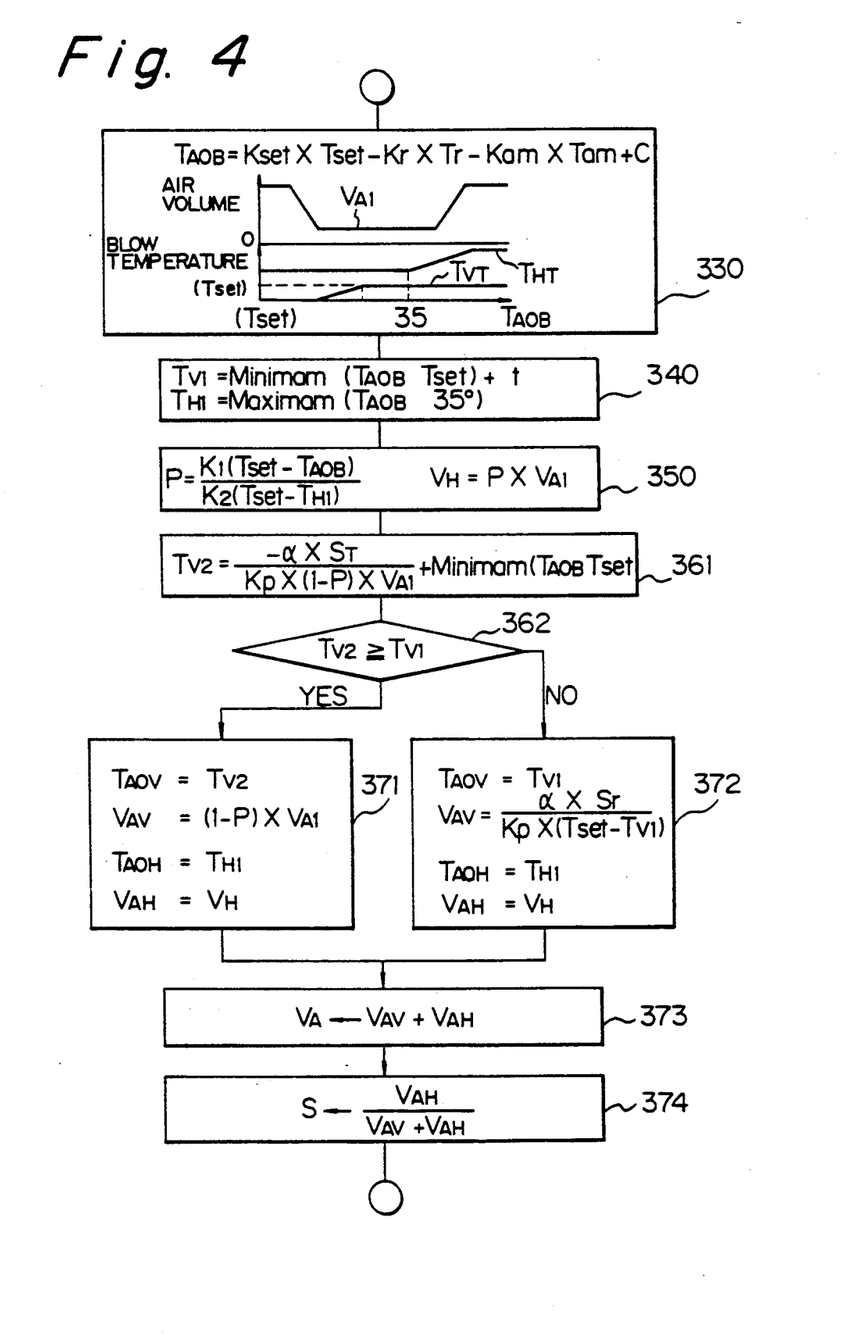
FIG. 4 is a flowchart showing the details of the flowchart of FIG. 3.

An operation of the embodiment of FIG. 2 will be explained with reference to FIGS. 3 and 4 in which FIG. 3 shows a schematic flow of the control apparatus 210 of FIG. 2, and FIG. 4 shows the details of Steps 330 through 370 of FIG. 3.

Step 310 initializes the control apparatus 210 at the start of operation, and Steps 320 through 700 are repeated to control the air conditioner.

Step 320 receives signals from the respective sensors, setting device and switch panel.

Step 330 finds a required blow temperature TAOB for air-conditioning the vehicle room according to the following equation (1):

$$TAOB = Kset \times Tset - Kr \times Tr - Kam \times Tam + C \qquad (1)$$

where Kset, Kr, Kam, and C are constants, Tam an ambient temperature, and Tr a room temperature. According to the required blow temperature TAOB and a pattern shown in Step 330 of FIG. 4, a required blow volume VA1 is determined. Unlike the equation for finding a required blow temperature of the conventional technique (the equation (2) of the Japanese Unexamined Patent Publication No. 56-86815), the equation (1) of the embodiment does not consider the signal ST detected by the solar radiation sensor 225. Namely, the constants Kset, Kr, Kam, and C are set to find a required blow temperature with which a vehicle room temperature can be set to the set temperature Tset, provided that there is no solar radiation.

Step 340 uses a relational expression shown in FIG. 4 to temporarily determine a lowest ventilation temperature TV1 for the ventilation diffuser 170 and a heating temperature TH1 for the heat diffuser 180.

If the temperature of air blown from the ventilation diffuser 170 to hit the upper body of a person in the vehicle is high, the person feels uncomfortable. To prevent this, the lowest ventilation temperature TV1 is set to be equal to or lower than the set temperature Tset.

Similarly, if the temperature of air blown from the heat diffuser 180 to hit the lower body of the person is low, the person feels unpleasant. To avoid this, the heating temperature TH1 is set to be equal to or higher than 35 degrees centigrade.

Restricting the temperatures TV1 and TH1 is done in Step 340 according to the following equations (2) and (3) which select minimum and maximum values, thereby temporarily setting the temperatures TV1 and TH1 as shown on the graph of Step 330:

$$TV1 = \text{Minimum } (TAOB, Tset) + \Delta t \qquad (2)$$

$$TH1 = \text{Maximum } (TAOB, 35^\circ C.) \qquad (3)$$

In the equation (2), the lowest ventilation temperature TV1 is applied with the correction value Δt which is determined according to the solar radiation quantity ST and ambient temperature Tam. In this way, the lowest ventilation temperature TV1 is temporarily set in a first target temperature region so that an increase in the room temperature and a hot feeling of the person in the vehicle caused by the solar radiation may be suppressed within a comfortable limit.

Figure 5:
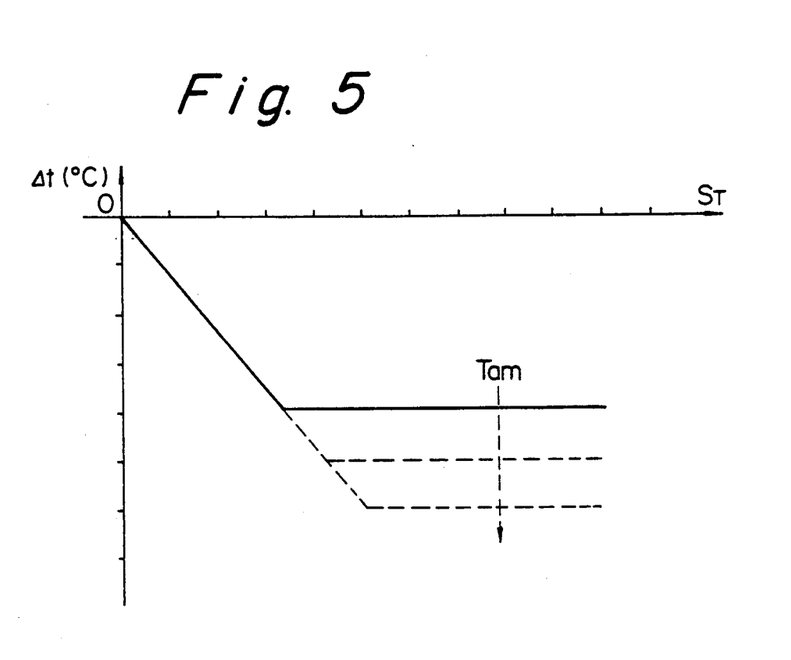
FIG. 5 is a graph showing a correction value in the temperature of blown air relative to the quantity of solar radiation, according to the embodiment.

The correction value Δt is stored in a proper memory as a function with the solar radiation quantity ST and ambient temperature Tam serving as variables. As shown in FIG. 5, the correction value Δt is a negative value to decrease the lowest ventilation temperature TV1 as the solar radiation quantity increases, and also to decrease the lowest ventilation temperature TV1 as the ambient temperature Tam increases as indicated with a dotted arrow mark in FIG. 5.

The correction values Δt are empirically obtained with the air conditioner being operated at a low (weak) stabilized air-conditioning state under various solar radiation quantities and ambient temperatures by variously changing the vent blow temperature to find blow temperatures at which a person in the vehicle feels comfortable.

If a correction value is smaller than Δt, i.e., if a decrease in ventilation temperature is too small, the person feels hot due to solar radiation, and if the correction value is larger than Δt, i.e., if a decrease in ventilation temperature is too large, the person feels cold and uncomfortable due to the great decrease in ventilation temperature.

Step 350 calculates a blow ratio of the ventilation diffuser 170 and heat diffuser 180 according to the following equation (4):

$$P = \{K1(Tset - TAOB)\}/\{K2(Tset - TH1)\} \quad (4)$$

where if $0 \leq (Tset - TH1) < 2$ then $(Tset - TH1) = 2$, if $0 > (Tset - TH1) > -2$ then $(Tset - TH1) = -2$, and if $P \leq 0$ then $P = 0$. The K1 and K2 are constants. Step 350 also calculates a temporary heating volume VH of the heat diffuser 180 according to the following equation (5):

$$VH = P \times VA1 \quad (5)$$

Namely, the heating volume VH is proportional to a required blow volume VA1 with the blow ratio P being a proportional constant. Apparently, $P = VH/VA1$. Here, the required blow volume VA1 is found in Step 330 of FIG. 3.

The blow ratio P in the equation (4) indicates a ratio of the ventilation volume and the heating volume, provided that there is no solar radiation. When $P=0$, it is complete ventilation, $P=1$ complete heating, and $0 < P < 1$ bi-level air conditioning.

As mentioned above, the embodiment limits the temperature of air from the heat diffuser 180 to more than 35° C., and the temperature of air from the ventilation diffuser 170 to less than Tset. When the required blow temperature TAOB is higher than the set temperature Tset and lower than the limit temperature of 35° C., the ventilation diffuser 170 provides air of Tset while the heat diffuser 180 provides air of 35° C.

With the temperatures of air from the ventilation diffuser and heat diffuser being fixed in this way, the embodiment changes the blow ratio P for the ventilation diffuser and heat diffuser according to the required blow temperature TAOB, thereby changing the heat quantity of air to be supplied into the vehicle room, bringing the room temperature Tr to the set temperature Tset, and maintaining the set temperature.

Figure 6:
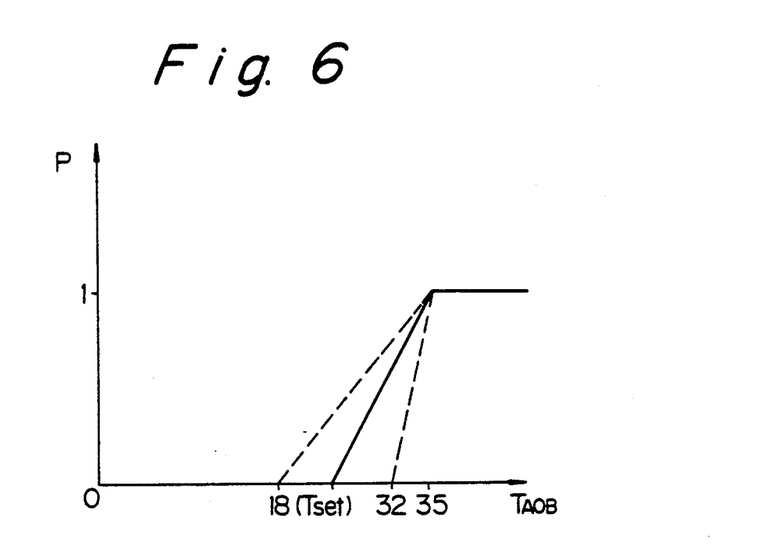
FIG. 6 is a graph showing air distribution characteristics of the embodiment.

The blow ratio P is variable, for example, with the set temperature Tset ranging from 18° C. to 32° C. so that the blow ratio P may change in a range of 0 to 1 according to the required blow temperature TAOB as shown in FIG. 6. A value of the required blow temperature TAOB with $P=0$ changes according to the set temperature Tset in a range indicated with dotted lines in FIG. 6.

Step 361 calculates a cancelling ventilation temperature TV2 belonging to a second target temperature range according to the following equation (6):

$$TV2 = (-\alpha \times ST)/\{Kp \times (1-P) \times VA1\} + Minimum \quad (TAOB, Tset) \quad (6)$$

where $Kp = Cp \times \gamma$, ST the solar radiation quantity, Cp the specific heat of air, γ a specific weight, and α a constant to be set according to a volume of a space to be air-conditioned in the vehicle, an area of window panels, and tastes. The cancelling ventilation temperature TV2 is to cancel heat in the vehicle room due to solar radiation with the ventilation volume of "$(1-P) \times VA1$" determined in Step 350. The reburied blow volume VA1 is found in Step 330 according to the required blow temperature TAOB. Since the temporary heating volume $VH = P \times VA1$ according to the equation (5), the ventilation volume is $VA1 - P \times VA1 = (1-P) \times VA1$.

This embodiment considers the lowest ventilation temperature TV1 temporarily set in Step 340 as a lower limit of ventilation temperature. When the cancelling ventilation temperature TV2 calculated according to the equation (6) is higher than the lowest ventilation temperature TV1 temporarily set in Step 340, heat in the vehicle due to the solar radiation is cancelled with the cancelling ventilation temperature TV2 which is higher than the lowest ventilation temperature TV1. When the cancelling ventilation temperature TV2 calculated according to the equation (6) is lower than the lowest ventilation temperature TV1, a final ventilation temperature is set to the lowest ventilation temperature TV1 because the lowest ventilation temperature TV1 is the lower limit of ventilation temperature. In this case, the heat in the vehicle due to the solar radiation is cancelled by increasing the ventilation volume.

Namely, the cancelling ventilation temperature TV2 calculated according to the equation (6) in Step 361 of FIG. 4 is to cancel the heat caused by the solar radiation ST with the final ventilation volume VAV of $(1-P) \times VA1$.

Step 362 compares the lowest comfortable ventilation temperature TV1 set in Step 340 with the cancelling ventilation temperature TV2 calculated in Step 361. According to a result of the comparison, the process branches to Step 371 or 372.

If $TV2 \geq TV1$, i.e., if it is possible to cancel the solar radiation quantity ST with a temperature higher than the lowest comfortable ventilation temperature TV1 temporarily set in Step 340, the final ventilation temperature TAOV is set to be the cancelling ventilation temperature TV2, the final ventilation volume VAV to $(1-P) \times VA1$, and the final heating volume VAH to the temporary heating volume VH.

If $TV2 < TV1$, i.e., if it is impossible to cancel the heat due to the solar radiation with the lowest ventilation temperature TV1 temporarily set in Step 340, the final ventilation temperature TAOV is set to the lowest ventilation temperature TV1, and the final ventilation volume VAV is determined according to the following equation (7):

$$VAV = (\alpha \times ST)/\{Kp \times (Tset - TV1)\} \quad (7)$$

where if $0 \leq (Tset - TV1) < 2$ then $(Tset - TV1) = 2$, and if $0 > (Tset - TV1) > -2$ then $(Tset - TV1) = -2$, and where $KP = Cp \times \gamma$, $Cp$ the specific heat of air, $\gamma$ a specific weight, and $\alpha$ a constant to be set according to the volume of a space to be air-conditioned in the vehicle, an area of window panels, and tastes.

The final ventilation volume VAV calculated according to the equation (7) can cancel the solar radiation quantity ST with the lowest comfortable ventilation temperature TV1.

Step 372 sets the final heating temperature TAOH to the heating temperature TH1, and the final heating volume VAH to the temporary heating volume VH.

Step 373 calculates a total blow volume VA to be blown by the blower 120 according to the final ventilation volume VAV and final heating volume VAH determined in Step 371 or 372, according to the following equation (8):

$$VA = VAV + VAH \quad (8)$$

Step 374 calculates a position S of the airflow distributing damper 141 to realize the final ventilation volume VAV and final heating volume VAH determined in Step 317 or 372, according to the following equation (9):

$$S = VAH/(VAV + VAH) = VAH/VA \quad (9)$$

Here, $S = 0$ indicates complete ventilation, $S = 1$ complete heating, and $0 < S < 1$ bi-level air conditioning in which a blow ratio changes according to S.

Step 380 finds a voltage to be applied to the motor 122 to realize the total blow volume VA calculated according to the equation (8), according to predetermined blower characteristics, and provides the motor driving circuit 123 with an instruction signal accordingly.

Step 390 provides the servomotor 142 with a driving signal for driving the damper 141 to achieve the damper position S calculated according to the equation (9).

Only when the final ventilation volume VAV is set to a certain value to achieve ventilation. Step 400 calculates a driving target value for the servomotor 153 for driving the air mixing damper 151, and Step 500 provides the servomotor 153 with the target value.

Step 400 calculates a target opening SW according to the final ventilation temperature TAOV, temperature TE behind the evaporator, heater core water temperature TW, and the following equation (10):

$$SW = (TAOV - TE)/(TW - TE) \times 100(\%) \quad (10)$$

Further, Step 400 feeds the temperature detected by the duct sensor 223 to the opening SW, thereby PID-controlling the target opening SW. As a result, the blow temperature can be correctly controlled at good responsibility.

Only when the final heating volume VAH is set to a certain value to achieve heating, Step 600 calculates a driving target value for the servomotor 163 for driving the air mixing damper 161, and Step 700 provides the servomotor 163 with the target value. The calculation in Step 600 is the same as that in Step 400.

The arrangement and operation of the air conditioner and control apparatus will be explained more precisely.

(1) Operation in summer where the ambient temperature increases to or more than, for example, 30° C.

It is supposed that a person in the vehicle enters a set temperature of 25° C. In this case, the required blow temperature TAOB according to the equation (1) may be lower than 25° C. because heat load in summer is high. The lowest ventilation temperature TV1 according to the equation (2) will be $TAOB + \Delta t$, and the heating temperature TH1 according to the equation (3) will be 35° C. Since TAOB<35° C., the blow ratio P according to the equation (4) is always 0, and the heating volume VH is always 0. As a result, the cancelling ventilation temperature TV2 according to the equation (6) is set to be a blow temperature that can cancel heat due to solar radiation with the required blow volume VA1.

(1) - (a)

When the solar radiation quantity ST is 0 during nighttime or in the shade, $\Delta t$ of the equation (2) will be 0, and the first term of the right side of the equation (6) will be 0. Since TV1=TV2, Step 371 of FIG. 4 sets the final ventilation temperature TAOV=TV2=Minimum (TAOB, Tset) and the final ventilation volume VAV=-VA1. As a result, the air conditioner supplies air form the ventilation diffuser 170 with the cancelling ventilation temperature TV2 and required blow volume VA1.

(1) - (b)

When the solar radiation quantity ST is small and when cancelling ventilation temperature TV2 according to the equation (6) is higher than lowest ventilation temperature TV1 according to the equation (2), Step 371 of FIG. 4 is executed. The final ventilation temperature TAOV is not decreased to TV1 but to TV2, and the ventilation volume is fixed at the required blow volume VA1. Namely, the heat due to the solar radiation is cancelled only by decreasing the ventilation temperature to TV2.

When there is no direct solar radiation which may give the person in the vehicle hot feeling, i.e., when it is slightly cloudy with solar radiation evenly and indirectly coming from the whole sky, the air conditioner can cancel the heat due to the solar radiation to maintain a proper room temperature in the vehicle. In addition, the room temperature does not decrease unnecessarily.

(1) - (c)

When the solar radiation quantity ST is larger and when the cancelling ventilation temperature TV2 of the equation (6) is lower than the lower ventilation temperature TV1 of the equation (2), Step 372 of FIG. 4 is executed. Namely, the final ventilation temperature TAOV is decreased to TV1, and the final ventilation volume VAV is calculated according to the equation (7). As a result, the heat due to the solar radiation is cancelled with the combination of the lowest ventilation temperature TV1 which is a lower limit at which the person in the vehicle feels comfortable, and the final ventilation volume VAV.

In this way, even if there is direct solar radiation, the heat due to the solar radiation can be cancelled to maintain a proper temperature in the vehicle room. Since the ventilation temperature is limited to the lowest ventilation temperature TV1, the person in the vehicle will not feel cold because the temperature is not decreased excessively. Namely, the cancellation of the heat due to the solar radiation and the cancellation of hot feeling of the person in the vehicle due to the solar radiation are simultaneously achieved.

(2) During spring and fall in which an ambient temperature is about 20° C.

It is supposed that the set temperature is 25° C. The required blow temperature TAOB of the equation (1) is about 25° C. The lowest comfortable ventilation temperature TV1 of the equation (2) will vary in a range of TAOB+Δt to Tset+Δt, and the heating temperature TH1 of the equation (3) will vary in a range of TAOB to 35° C.

The blow ratio P calculated according to the equation (4) will vary in a range of 0 to 1, and the heating volume will be in a range of 0 to VA1 (the required blow volume according to TAOB).

As a result, the cancelling ventilation temperature TV2 of the equation (6) can cancel the heat due to the solar radiation with the blow volume of (1−P)×VA1.

(2)-(a)

When the solar radiation quantity ST is 0, Δt of the equation (2) will be 0, and the first term of the right side of the equation (6) will also be 0, so that Step 371 of FIG. 4 is executed according to TV1=TV2. As a result, the air conditioner is operated with the blow temperature and volume temporarily set in Steps 340 and 350.

(2)-(b)

If the equation (4) provides P<1 to blow a certain amount of air from the ventilation diffuser 170 and when the solar radiation quantity ST is small, i.e., when the cancelling ventilation temperature TV2 calculated according to the equation (6) is higher than the lowest ventilation temperature TV1 calculated according to the equation (2), Step 371 of FIG. 4 is executed. As a result, the final ventilation temperature TAOV is not decreased to TV1 but only to TV2, and the ventilation volume is fixed to (1−P)×VA1. Namely, the received heat quantity of the vehicle due to the solar radiation is cancelled with the cancelling ventilation temperature TV2 and the fixed ventilation volume.

The received heat quantity of the vehicle due to the solar radiation can be cancelled to maintain a proper temperature in the vehicle room, while the ventilation temperature is not excessively lowered.

(2)-(c)

When the equation (4) provides P<1 to blow a certain amount of air from the ventilation diffuser 170 and when the solar radiation quantity ST is large so that the cancelling ventilation temperature TV2 of the equation (6) is lower than the lowest comfortable ventilation temperature TV1 of the equation (2), Step 372 of FIG. 4 is executed. The final ventilation temperature TAOV is lowered to TV1, and the final ventilation volume VAV is calculated according to the equation (7). Namely, the heat due to the solar radiation can be cancelled by a combination of the lowest ventilation temperature TV1 which is a lower limit at which the person in the vehicle feels comfortable, and the final ventilation volume VAV.

(2)-(d)

If the equation (4) provides P=1, the cancelling ventilation temperature TV2 of the equation (6) will be −∞ irrespective of the solar radiation quantity ST. As a result, Step 362 of FIG. 4 provides a judgment of NO to execute Step 372. Even if Steps 340 and 350 temporarily set a ventilation volume of 0, the lowest ventilation temperature TV1 is set, if there is solar radiation, according to the quantity of the solar radiation, and the final ventilation volume VAV is also set according to the equation (7), thereby controlling air in the vehicle room.

In this way, if there is solar radiation during heating, the invention provides a lowest comfortable ventilation temperature and a minimum ventilation volume according to the solar radiation to cancel heat due to the solar radiation. As a result, the invention can cancel the heat due to the solar radiation while keeping the head of the person in the vehicle cool and its feet warm by providing a comfortable room temperature distribution. Since the ventilation temperature and volume are set only to cancel the received heat quantity due to the solar radiation, they do not influence the controllability of room temperature.

(3) In winter during which the ambient temperature falls, for example, below 10° C.

It is supposed that the person in the vehicle sets a set temperature of 25° C. The required blow temperature TAOB of the equation (1) is higher than 25° C. and usually exceeds 35° C. to cope with large heating load in winter. As a result, the lowest ventilation temperature TV1 of the equation (2) will be TAOB+Δt, and the heating temperature TH1 of the equation (3) will be the required blow temperature TAOB.

Since TAOB=TH1, the blow ratio P calculated according to the equation (4) is always 1, thereby setting the heating volume VH to VA1.

(3)-(a)

When the solar radiation quantity ST is 0, Δt of the equation (2) will be 0, and the first term of the right side of the equation (6) will be 0. Since TV2=TV1, Step 371 of FIG. 4 sets TAOV=TV2=Tset, VAV=0, TAOH=TH1=TAOB, and VAH=VH=VA1. As a result, the air conditioner supplies air into the room of the vehicle at the temperature of TH1 and volume of VA1 from the heat diffuser 180.

(3)-(b)

If the solar radiation quantity ST takes a certain value, the cancelling ventilation temperature TV2 of the equation (6) will be −∞. With P=1 and solar radiation, Step 372 is always executed. The lowest ventilation temperature TV1 corresponding to the solar radiation quantity ST is set as the final ventilation temperature TAOV, and the final ventilation volume VAV is calculated according to the equation (7) to cancel the received heat quantity of the vehicle due to the solar radiation with the lowest ventilation temperature TV1.

Even under the heating condition in winter, the ventilation temperature and volume are set, if there is solar radiation, according to the solar radiation.

As explained above, according to the embodiment, the received heat quantity of the vehicle due to the solar radiation is cancelled only by changing the blow temperature and volume of the ventilation diffuser, so that the feet of a person in the vehicle will never be cooled during the cancellation of the heat due to the solar radiation.

A decrease in ventilation temperature for giving a person in the vehicle a comfortable feeling is preset as a correction value Δt according to the quantity of solar radiation. When a decrease in ventilation temperature necessary for cancelling heat due to solar radiation does not exceed Δt, the heat due to the solar radiation can be cancelled only by decreasing the ventilation temperature.

When the decrease in ventilation temperature necessary for cancelling the heat due to the solar radiation exceeds Δt, the decrease is limited to the Δt, and the remaining heat that cannot be cancelled by the temperature decrease of $\Delta t$ can be cancelled by increasing ventilation volume.

In this way, the ventilation temperature will not be decreased excessively, and the person in the vehicle will not feel cold. In particular, by limiting the decrease in ventilation temperature for cancelling the solar radiation, the person in the vehicle will not feel cold on the face, which is thermally sensitive. The remaining heat of the solar radiation that cannot be cancelled because of limiting the decrease in ventilation temperature can be cancelled by increasing ventilation volume. The embodiment thus cancels the heat quantity of the vehicle due to the solar radiation to prevent the person in the vehicle from sensing a hot feeling, thereby providing comfortable air conditioning.

As shown in FIG. 5, the correction value $\Delta t$ becomes larger as an ambient temperature increases so that a person in the vehicle may not feel hot and uncomfortable due to the solar radiation in summer for example. In winter, however, solar radiation does not bother a person in the vehicle so much. In this case, the embodiment employs a relatively relaxed measure to cope with the solar radiation.

The embodiment allows a great decrease in ventilation temperature in summer while limiting the decrease in ventilation temperature in a narrow range in winter. In this way, the decrease in ventilation temperature can be set depending on the feeling of the person in the vehicle with respect to the ventilation temperature, the feeling changing depending on seasons (the person requiring cool air in summer and warm air in winter).

In the above embodiment, the ventilator and heater have air mixing units respectively to independently control ventilation and heating temperatures and volumes. It is possible to employ only one air mixing unit. In this case, a cool air bypassing mechanism is employed to independently control the ventilation and heating temperatures and volumes. With the cool air bypassing mechanism, the ventilation temperature and volume change according to a flow rate of air to be bypassed, and the heating temperature and volume also change according to the cool air bypassed quantity. It is necessary, therefore, to control the cool air bypassed quantity, the opening of the air mixing damper, and the mechanism for distributing air for ventilation and heating in a way not to cause mutual intervention.

In the above embodiment, an air distribution ratio changes depending on the openings of the two air mixing dampers, so that the position S (opening) of the damper 141 may be corrected according to the difference between the openings of the two air mixing dampers.

The air distribution ratio also changes according to the opening and closing of the ventilation diffuser (a side vent and a center vent) and the grill of the heat diffuser, so that the opening S may be corrected.

It is possible to arrange a damper on the downstream side of the heater core 152 to collect air from both the air mixing units 150 and 160 and send the air toward the ventilation diffuser 170 or the heating diffuser 180. When the opening S of the damper 141 becomes 0 or 1 to achieve complete ventilation or complete heating, the added damper changes a blow mode, and the damper 141 is driven to a neutral position. This arrangement can demonstrate maximum heating capacities of both air mixing units and prevent ventilation resistance from increasing.

In the above embodiment, the required blow temperature TAOB calculated according to the equation (1) does not take a solar radiation component into account, and the solar radiation is considered in the ventilation temperatures TV1 and TV2 calculated according to the equations (2) and (6) and in the ventilation volume VAV calculated according to the equation (7). Consequently, only the ventilation temperature and volume change in response to the solar radiation.

If there is solar radiation in winter, the embodiment can relax a hot feeling of a person in the vehicle due to the solar radiation by decreasing the temperature of air blown toward the upper body of the person in the vehicle without decreasing a temperature around the feet of the person.

It is also possible to add an indirect solar radiation component (a skylight radiation component) to the equation (1) for calculating the required blow temperature TAOB. The indirect component is about 20% of detected solar radiation quantity. The remaining 80% of the solar radiation quantity is treated as a direct component of the solar radiation and considered in the equations (2), (6), and (7). This technique provides substantially the same effect, and in addition, can quickly cancel an increase in temperature due to the solar radiation around the feet of a person in the vehicle.

In the above embodiment, the received heat quantity of a vehicle due to solar radiation changes in proportion to the solar radiation quantity ST. The heat quantity must be calculated according to the kind of the vehicle such as sedan, hatchback, van and truck, the shapes of windows, and the kind of glass. These characteristics of the vehicles must be found through tests.

Since the received heat quantity of a vehicle changes depending on an incident direction and an incident elevation angle of the solar radiation, the solar radiation sensor may detect the orientation and altitude of the sun so that the received heat quantity may be calculated according to the quantity, incident direction, and incident elevation angle of the solar radiation with respect to the vehicle.

As described above, the invention sets a decrease in blow temperature to give a person in a vehicle a comfortable feeling according to the quantity of solar radiation coming into the vehicle, and with the decrease in blow temperature, cancels heat in the vehicle due to the solar radiation. In this case, the invention limits the decrease in blow temperature to be smaller than a comfortable decrease, so that the person in the vehicle may not feel cold. Since the decrease in blow temperature is limited to be equal to or less than the comfortable decrease, the heat due to the solar radiation, in some cases, may not be completely cancelled by the decrease in blow temperature. The invention cancels this remaining heat by increasing a blow volume, thereby preventing temperature in the vehicle room from increasing. The invention can cancel the heat due to the solar radiation by adjusting the temperature and volume of ventilation in the vehicle room. Since the invention limits a decrease in blow temperature, a person in the vehicle may never feel cold, and the inside of the vehicle can comfortably be air-conditioned against solar radiation.

We claim:

1. A control apparatus for an air conditioner used for a vehicle, for setting target temperatures and adjusting and maintaining the temperatures of air to be blown into the room of the vehicle according to the target temperatures, comprising:

a solar radiation sensor for detecting a quantity of solar radiation coming into the vehicle room;

an operation means for entering a set temperature;

a target temperature determining means for receiving and processing a solar radiation quantity signal from the solar radiation sensor and a set temperature signal from the operation means, and successively finding the target temperatures in the course of said processing operation said target temperature determining means including:

a first processing means for processing a first air blow temperature which will decrease a value of the temperature of the vehicle room, said first processing means having a certain limitation of an amount of the decrease which is based on the solar radiation quantity signal from the solar radiation sensor and a set temperature signal from said operation means;

a second processing means for processing a second air blow temperature which cancels a temperature increment in said room of the vehicle caused by the solar radiation quantity, on the basis of the solar radiation quantity signal from the solar radiation sensor and the set temperature signal from said operation means;

a target temperature determining means for determining a target temperature by selecting any one of said first air blow temperature from said first processing means and said second air blow temperature from said second processing means; and an adjusting means for adjusting the temperatures of air to be blown into the vehicle room according to the target temperatures.

2. A control apparatus for an air conditioner used for a vehicle, for setting target temperatures and adjusting and maintaining the temperatures of air to be blown into the room of the vehicle according to the target temperatures, comprising:

a solar radiation sensor for detecting a quantity of solar radiation coming into the vehicle room;

an operation means for entering a set temperature;

a target temperature determining means for successively finding the target temperatures according to the quantity of solar radiation detected by the solar radiation sensor and the set temperature provided by the operation means, said target temperature determining means comprising:

a first processing means for processing a first target temperature at which a value of the temperature in said vehicle room decreases by an amount which has a certain limitation which is based on a solar radiation quantity signal from the solar radiation sensor and a set temperature signal from said operation means;

a second processing means for processing a second target temperature increment in said room of the vehicle caused by the solar radiation quantity on the basis of the solar radiation quantity signal from the solar radiation sensor and the set temperature signal from said operation means; and a target temperature determining means for determining a target temperature by selecting any one of said first target temperatures which is processed by said first processing means and said second target temperature which is processed by said second processing means according to a predetermined program; and an adjusting means for adjusting the temperatures of air to be blown into the vehicle room according to the target temperatures.

3. A control apparatus for an air conditioner used for a vehicle, for setting target temperatures and adjusting and maintaining the temperatures of air to be blown into the room of the vehicle according to the target temperatures, comprising:

a solar radiation sensor for detecting the quantity of solar radiation coming into the vehicle room;

an operation means for entering a set temperature;

a target temperature determining means for determining the target temperatures according to the quantity of solar radiation provided by the solar radiation sensor and the set temperature provided by the operation means, said target temperature determining means comprising:

a first processing means for processing a first value in which a value of the temperature decreases but a value of the decrease thereof has a certain limit, based of a solar radiation quantity signal from the solar radiation sensor and a set temperature signal from said operation means;

a second processing means for processing a second value in which a temperature value decreases in response to an increment of a solar radiation quantity on the basis of the solar radiation quantity signal from the solar radiation sensor and the set temperature signal from said operation means;

a target temperature determining means for determining a target temperature by selecting any one of said first value which is processed by said second processing means according to a predetermined program; and an adjusting means for adjusting the temperatures of air to be blown into the vehicle room according to the target temperatures.

4. A control apparatus as set forth in claim 3, further comprising a means for detecting an ambient temperature outside the vehicle room, wherein the first values of the target temperatures are less restricted from decreasing as the ambient temperature increases.

5. A control apparatus as set forth in claim 3, wherein the target temperature determining means successively determines final target temperatures by comparing the first and second values thereof with each other.

6. A control apparatus for air conditioner used for a vehicle, for setting target temperatures and adjusting and maintaining the temperatures of air to be blown into the room of the vehicle according to the target temperatures, comprising:

a solar radiation sensor for detecting the quantity of solar radiation coming into the vehicle room;

an operation means for entering a set temperature;

a room temperature detecting means for detecting temperature in the vehicle room;

a first operation means for providing a first blow temperature according to at least the quantity of solar radiation provided by the solar radiation sensor and the set temperature provided by the operation means, the first blow temperature decreasing as the quantity of solar radiation increases but having a limitation of a decrement ratio;

a second operation means for providing a second blow temperature according to the quantity of solar radiation provided by the solar radiation sensor, the set temperature provided by the operation means, and the room temperature provided by the room temperature detecting means, the second blow temperature being for cancelling an increase in temperature in the vehicle room;

a selection means for selecting one of the first and second blow temperatures provided by the first and second operation means, and setting the selected blow temperature as a target temperature; and an adjusting means for adjusting the temperature of air to be blown into the vehicle room according to the target temperature.

7. A control apparatus as set forth in claim 6, wherein the selection means comprises:

a comparison means for comparing the first blow temperature with the second blow temperature;

a first adjusting means for setting the second blow temperature as the target temperature when the second blow temperature is higher than the first blow temperature; and a second adjusting means for setting the first blow temperature as the target temperature when the second blow temperature is lower than the first blow temperature.

8. A control apparatus as set forth in claim 6, further comprising a means for increasing the volume of air to be blown toward an upper part of the vehicle room when the selection means switches the target temperature from the second blow temperature to the first below temperature.

9. A control apparatus for air conditioner used for a vehicle, for setting target temperatures and adjusting and maintaining the temperatures of air to be blown to upper and lower parts of the room of the vehicle according to the target temperatures, comprising:

a solar radiation sensor for detecting the quantity of solar radiation coming into the vehicle room;

an operation means for entering a set temperature;

a means for finding a heat cancelling temperature according to the quantity of solar radiation provided by the solar radiation sensor and the set temperature provided by the operation means, the heat cancelling temperature being for cancelling the heat received by the vehicle room due to an increase in the quantity of solar radiation;

a means for increasing the volume of air oriented toward the upper part of the vehicle room when the target temperature is higher than the heat cancelling temperature; and an adjusting means for adjusting the temperature of air to be blown into the vehicle room according to the target temperature.

10. A control apparatus for air conditioner used for a vehicle, for setting target temperatures and adjusting and maintaining the temperatures of air to be blown to upper and lower parts of the room of the vehicle according to the target temperatures, comprising:

a solar radiation sensor for detecting the quantity of solar radiation coming into the vehicle room;

an operation means for entering a set temperature;

a means for finding a target temperature according to the quantity of solar radiation provided by the solar radiation sensor and the set temperature provided by the operation means, the target temperature being for dealing with an increase in the quantity of solar radiation;

a means for increasing the volume of air oriented toward the upper part of the vehicle room when the target temperature is too high with respect to the quantity of solar radiation; and an adjusting means for adjusting the temperature of air to be blown into the vehicle room according to the target temperature.

11. A control apparatus for controlling an air conditioner (100) for a vehicle, the air conditioner (100) having a blower (120) for producing a wind which passes through an evaporator (131) and a switching damper (141) and exits from a ventilation diffuser (170) oriented upward into the room of the vehicle and a heat diffuser (180) oriented downward into the vehicle room, the controlling apparatus comprising:

a solar radiation sensor (226) for detecting the quantity of solar radiation coming into the vehicle room;

a temperature setting device (227) through which a set temperature (Tset) is entered; and a controller for receiving signals from the solar radiation sensor and temperature setting device and controlling the wind volume of the blower (120) and the heat exchanging condition between the evaporator (131) and the wind provided by the blower, the controller involving:

a means for finding a required blow temperature (TAOB) and a required blow volume (VA1) according to the set temperature (Tset) provided by the temperature setting device;

a means for finding a correction value ($\Delta t$) according to a characteristic curve which involves a region in which the correction value is relatively small and increases as the quantity of solar radiation provided by the solar radiation sensor increases and a region in which the correction value is relatively large and increases only slightly as the quantity of solar radiation increases;

a means for finding a lowest comfortable ventilation temperature (TV1) belonging to a first target temperature region according to the required blow temperature (TAOB), set temperature (Tset), and correction value ($\Delta t$);

a means for setting a heating temperature (TH1) exceeding a predetermined temperature according to the required blow temperature (TAOB);

a means for setting a blow ratio (P) for distributing air to the ventilation diffuser (170) and heat diffuser (180) according to the required blow temperature (TAOB), set temperature (Tset), and heating temperature (TH1);

a means for finding a cancelling ventilation temperature (TV2) belonging to a second target temperature region with a blow volume of "$(1-P) \times VA1$" of the ventilation diffuser (170), for cancelling an increase in temperature in the vehicle room due to the solar radiation;

a means for comparing the lowest comfortable ventilation temperature (TV1) with the cancelling ventilation temperature (TV2), and selecting the cancelling ventilation temperature as a final ventilation temperature if the cancelling ventilation temperature (TV2) is higher than the lowest comfortable ventilation temperature (TV1), or if not so, the lowest comfortable ventilation temperature (TV1) as the final ventilation temperature;

a means for determining, with the cancelling ventilation temperature (TV2) being the final ventilation temperature, a final ventilation volume of the ventilation diffuser (170) to be $(1-P) \times VA1$, and a final heating volume (VAH) of the heat diffuser (180) to be P×VA1;

a means for determining, with the lowest comfortable ventilation temperature (TV1) being the final ventilation temperature, a final ventilation volume according to the quantity of solar radiation, set temperature (Tset), and lowest comfortable ventilation temperature (TV1) so that the final ventilation volume may exceed the one calculated according to the blow ratio (P), and a final heating volume (VAH) of the heat diffuser (180) to be P×VA1;

a means for finding a total blow volume of the final ventilation volume (VAV) and final heating volume (VAH) to control the blower (120);

a means for controlling the switching damper (141) according to the final ventilation volume (VAV) and final heating volume (VAH); and a means for controlling the heat exchanging condition between the evaporator (131) and wind provided by the blower (120) to realize the final ventilation temperature.

* * * * *